(12) United States Patent
Gakhar et al.

(10) Patent No.: US 7,944,401 B2
(45) Date of Patent: May 17, 2011

(54) RADIATING ELEMENT FOR A SIGNAL EMITTING APPARATUS

(75) Inventors: Sudhanshu Gakhar, Neenah, WI (US); Duane Josephe Shukoski, Neenah, WI (US); Thomas Michael Ales, Neenah, WI (US); Shawn Jeffery Sullivan, Neenah, WI (US); Andrew Mark Long, Appleton, WI (US); Davis-Dang H. Nhan, Appleton, WI (US); Sridhar Ranganathan, Suwanee, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 424 days.

(21) Appl. No.: 12/129,358

(22) Filed: May 29, 2008

(65) Prior Publication Data
US 2009/0295657 A1  Dec. 3, 2009

(51) Int. Cl.
*H01Q 1/12* (2006.01)
*H01Q 1/36* (2006.01)

(52) U.S. Cl. ........ 343/718; 343/793; 343/897; 428/370; 428/371; 428/372

(58) Field of Classification Search .................. None
See application file for complete search history.

(56) References Cited

U.S. PATENT DOCUMENTS

| | | | |
|---|---|---|---|
| 3,265,557 A | 8/1966 | DeFries et al. | |
| 3,367,851 A | 2/1968 | Filreis et al. | |
| 3,556,932 A | 1/1971 | Coscia et al. | |
| 3,998,689 A | 12/1976 | Kitago et al. | |
| 4,820,170 A | 4/1989 | Redmond et al. | |
| 4,888,234 A * | 12/1989 | Smith et al. | 442/371 |
| 5,284,703 A | 2/1994 | Everhart et al. | |
| 5,312,678 A * | 5/1994 | McCullough et al. | 442/189 |
| 5,324,579 A | 6/1994 | Sassa et al. | |
| 5,585,170 A | 12/1996 | Morris et al. | |
| 5,808,554 A | 9/1998 | Shuminov | |
| 6,071,836 A * | 6/2000 | St. Lawrence et al. | 442/237 |
| 6,163,262 A | 12/2000 | Wu | |
| 6,474,367 B1 | 11/2002 | Jayaraman et al. | |
| 6,596,533 B1 * | 7/2003 | Erbs et al. | 435/320.1 |
| 7,004,994 B2 * | 2/2006 | Hampden-Smith et al. | 75/351 |
| 7,157,134 B2 | 1/2007 | Makela et al. | |
| 7,597,769 B2 * | 10/2009 | Hampden-Smith et al. | 148/513 |

(Continued)

FOREIGN PATENT DOCUMENTS

EP  1674036 A1  6/2006

(Continued)

OTHER PUBLICATIONS

Hoon, S.R. et al.,"Time-dependent resistivity in carbon fibre sheets", *Journal of Materials Science 20*, pp. 3311-3319, 1985.

(Continued)

*Primary Examiner* — Trinh V Dinh
(74) *Attorney, Agent, or Firm* — Dority & Manning, P.A.

(57) ABSTRACT

A radiating element made from a conductive-nonwoven web is incorporated into a signal emitting apparatus. The signal emitting apparatus, for instance, may comprise an RFID tag. The conductive-nonwoven web contains, in one embodiment, conductive fibers combined with pulp fibers. The conductive fibers may comprise carbon fibers. The nonwoven web may be made using a conventional paper-making process. The resulting conductive web is not only well suited for use as an antenna, but is also relatively inexpensive to manufacture and can be easily incorporated into numerous products.

29 Claims, 2 Drawing Sheets

U.S. PATENT DOCUMENTS

| | | | |
|---|---|---|---|
| 7,612,673 B2 | 11/2009 | Onderko et al. | |
| 7,779,521 B2 * | 8/2010 | Topolkaraev et al. | 28/104 |
| 2003/0155347 A1 | 8/2003 | Oh et al. | |
| 2006/0096115 A1 | 5/2006 | Lee | |
| 2006/0238436 A1 * | 10/2006 | Deaett et al. | 343/897 |
| 2007/0014299 A1 | 1/2007 | Chang | |
| 2007/0024457 A1 | 2/2007 | Long et al. | |
| 2007/0035528 A1 | 2/2007 | Hodge | |
| 2009/0036012 A1 | 2/2009 | Nhan et al. | |
| 2009/0321238 A1 | 12/2009 | Nhan et al. | |
| 2010/0155006 A1 | 6/2010 | Ales et al. | |

FOREIGN PATENT DOCUMENTS

| | | |
|---|---|---|
| GB | 2250121 A | 5/1992 |
| WO | WO 02/16920 A2 | 2/2002 |

OTHER PUBLICATIONS

Jang, Joon and S.K. Ryu, "Physical property and electrical conductivity of electroless Ag-plated carbon fiber-reinforced paper", *Journal of Materials Processing Technology 180*, pp. 66-73, 2006.

Van Heest, Cara, "Electrolux, Kimberly Clark and the Printed Electronics Uptake", *Printed Electronics World*- http://www.printedelectronicsworld.com/articles/electrolux_kimberly_clark_and_the_printed_electronics_uptake_00002094.asp, Mar. 10, 2010.

Abstract—JP 2004342509

Abstract—JP 2004306389

* cited by examiner

RADIATING ELEMENT FOR A SIGNAL EMITTING APPARATUS

BACKGROUND

Advances in miniaturization technology have resulted in the development of increasingly small electronic devices for sensing a diverse array of quantities. Similar advances in wireless communication technology combined with the increased popularity of interconnected computer systems, such as the Internet, provide the technology necessary to cost effectively transfer vast amounts of data between two or more computers. The combination of such technologies provide the ability to use small sensors and processors to monitor, track and transmit data.

Radio Frequency Identification Devices (RFIDs), for example, are low-cost, "smart" chips or "tags" that can be embedded in or attached to articles, products, and the like to convey information about the product via a scanner. The smart tags are generally small label-like devices with a microchip and a miniature embedded antenna. The tags may be passive or active, the active tags requiring an internal power supply. A reader or scanner interrogates the smart tag with an electronic "trigger" signal. The tag in turn generates an electromagnetic pulse response that is readable by the scanner, the response containing the product information. RFID smart tags can be embedded in or attached to product packaging, or incorporated directly into the product, and may convey conventional "bar code" information, as well as other more detailed information.

Various commercial applications have been suggested for smart tags, particularly in the area of retail marketing and sales. For example, RFID technology may be used to gather information related to consumer trends, purchasing habits, consumption rates, etc. It has also been suggested that RFID technology has promise in the areas of inventory control, manufacturing process and control, product accountability, tracking systems, etc. Manufacturers, shippers, and retailers may be able to follow a given product through their respective systems from initial production through to point of sale. It has been suggested that other applications may include shopping carts that automatically charge a bank account, refrigerators that tap into the Internet to automatically reorder items that are running low, and interactive televisions linked to such refrigerators that will feed targeted commercials and special offers to consumers.

Electronic devices, such as RFIDs, typically include a data circuit in communication with an antenna. The data circuit, for instance, may comprise an integrated circuit chip that may include various electronic components. The antennae, on the other hand, have been formed in the past from conductive inks or from metallic foils. Problems have also been experienced, however, in incorporating the antennae into consumer goods, other products, or into the packaging in which the goods are to be shipped and sold. Metallic antennae, for instance, are unsuitable for use in some products. In addition, many of the antennae proposed in the past can add significant cost to the product.

In view of the above, a need exists for a signal generating device that has an improved antenna construction. In particular, a need exists for a low cost antennae that is made from recyclable/sustainable materials and that is easy to incorporate into packaged consumer goods.

SUMMARY

In general, the present disclosure is directed to an improved radiating element, such as an antenna, for any suitable electronic device. The electronic device, for instance, may be configured to emit a signal that conveys information to a receiving device in a wireless manner. Antennae made according to the present disclosure are particularly well suited for transmitting such signals. In addition, the antennae are relatively inexpensive to produce, can easily be incorporated into various products and into the packaging for the products and can be made without containing any metallic materials.

For example, in one particular embodiment, the present disclosure is directed to an electronic signal emitting apparatus. The apparatus includes a signal generating device which may comprise, for instance, a radio frequency identification device. In other embodiments, however, the signal generating device may comprise any electronic device that is configured to sense and/or record data and transmit the data to a receiving device. In one embodiment, for instance, the signal generating device may comprise a medical device that senses a physiological condition within the body of a patient.

In accordance with the present disclosure, the signal generating device is in communication with a radiating element, such as an antenna. The radiating element, for instance, can receive and transmit signals from the signal generating device. In accordance with the present disclosure, the radiating element comprises a nonwoven web containing pulp fibers in conjunction with conductive fibers. As used herein, the term "conductive" refers to a material that is electrically conductive. The nonwoven web, for instance, may contain pulp fibers in an amount of at least about 30% by weight, such as in an amount of about 50% by weight. The conductive fibers, on the other hand, may be present in the nonwoven web in an amount sufficient for the nonwoven web to have desired conductivity properties.

For example, in one embodiment, the conductive fibers may be present in the nonwoven web in an amount of at least 10% by weight, such as in an amount of at least about 25% by weight. The conductive fibers may comprise, for instance, metallic fibers, conductive polymeric fibers, or metal coated fibers. In one particular embodiment, the conductive fibers may comprise carbon fibers. The conductive fibers may be present in the nonwoven web such that the web has a conductivity of at least 1000 S/m.

The signal generating device can be configured to transmit signals in any suitable frequency range. In one embodiment, for instance, the apparatus may transmit signals in the ultra-high frequency range. In this embodiment, the radiating element may comprise two strips of the nonwoven web to define two antenna portions. The radiating element, for instance, may form a half-wave dipole antenna.

The dimensions of the nonwoven web used to form the radiating element can vary depending upon the particular application. In particular, the dimensions of the nonwoven web can be designed based upon the frequency at which the signal is to be transmitted from the apparatus. In one embodiment, for instance, the radiating element may comprise two strips of the nonwoven web having a length to width ratio of from about 10 to about 50. In one embodiment, for instance, each strip of the nonwoven web may have a length of about 144 mm and a width of about 8 mm for particularly functioning at a frequency of 915 MHz.

The nonwoven web can be made using any suitable method or technique. In one embodiment, for instance, the nonwoven web comprises a wet-laid web made according to a papermaking process. The web, for instance, in one embodiment, can have a bulk of at least about 2 cc/g and can have a basis weight of from about 15 gsm to about 100 gsm. In an alternative embodiment, the bulk can be less than about 2 cc/g, such as less than about 1 cc/g, such as less than about 0.5 cc/g, such as even less than about 0.05 cc/g. The conductive fibers can be present in the nonwoven web throughout the thickness of the web or the nonwoven web can comprise a single ply web containing distinct layers of conductive fibers. In this embodiment, the conductive fibers can all be contained within a layer of the single ply web. In one particular embodiment, for instance, the nonwoven web may include three distinct layers. The conductive fibers may be present in the middle layer.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
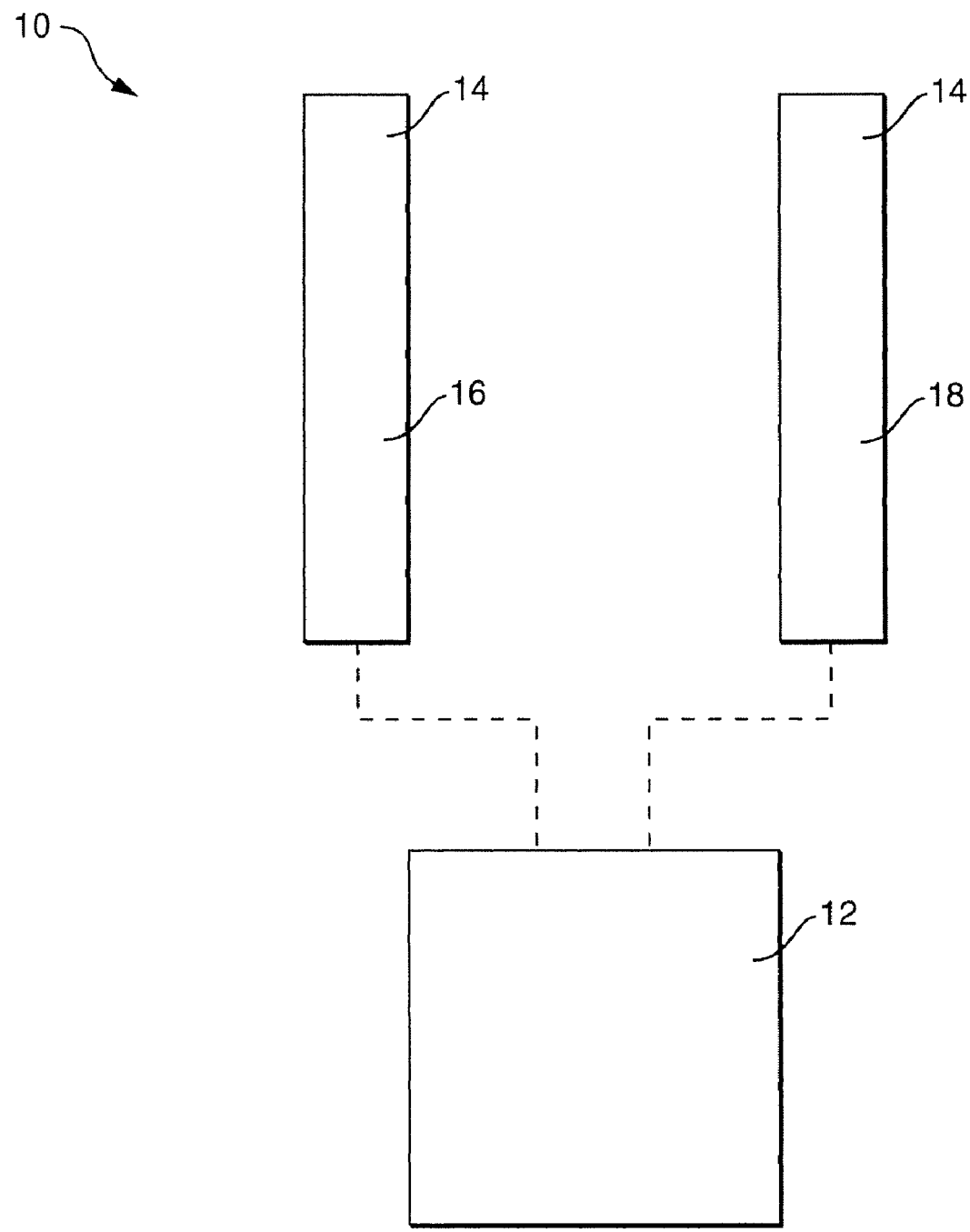
FIG. 1 is a plan view of one embodiment of an electronic signal emitting apparatus made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

In general, the present disclosure is directed to the construction of a radiating element, such as an antenna, for an electronic device. The radiating element may be used to receive and/or transmit signals wirelessly. In accordance with the present disclosure, the radiating element is made from a nonwoven, conductive web. For instance, in one embodiment, the nonwoven web may contain pulp fibers and can be made according to a paper-making process. For instance, the nonwoven web may comprise a wet-laid web containing pulp fibers and conductive fibers.

The nonwoven, conductive web can be constructed so as to have electrical properties suitable for use as a radiating element. Of particular advantage, the conductive, nonwoven web may be significantly less expensive to produce than many traditional antennae used in the past. In addition, the conductive, nonwoven web is flexible allowing for its incorporation into numerous products and packaging and is disposable if desired. In one embodiment, the conductive, nonwoven web can be used as a half-wave dipole antenna allowing for a low cost data transmission system. In one particular application, for instance, the radiating element of the present disclosure may be used to construct a unique low cost radio frequency identification device (RFID).

Referring to FIG. 1, a diagrammatical view of an electronic signal emitting apparatus 10 made in accordance with the present disclosure is shown. As illustrated, the apparatus includes a signal generating device 12 in communication with a radiating element, such as an antenna 14. The signal generating device 12 can comprise any electronic device that may need an antenna for transmitting or receiving signals. The signal generating device 12, for instance, may include a read-only device which includes a fixed electronic code. Alternatively, the signal generating device 12 may be a read-write device, which allows an updating of prior information or an addition of new information. The signal generating device 12 may also be associated with sensors to read detected information and transmit a signal responsive to the detected information, such as a value detected from a biosensor.

In one embodiment, the signal generating device 12 may comprise an RFID tag. As shown in FIG. 1, when the apparatus comprises an RFID tag, the signal generating device 12 comprises an RF transponder attached to the antenna 14. The antenna 14 comprises a first antenna portion 16 spaced from a second antenna portion 18.

RFID tags come in three general varieties including passive tags, active tags, or semi-passive tags. Passive tags require no internal power source and are activated by a reader which powers the device. Semi-passive tags and active tags, on the other hand, require a power source, usually a small battery.

Generally, conductive or passive tags include silicon or other semiconductors, a capacitor, and a substrate on which the components are mounted or embedded. A protective covering is typically used to encapsulate and seal the substrate. Inductive or passive smart tags have been introduced by Motorola under the name "BiStatix". A detailed description of the BiStatix device may be found in U.S. Pat. No. 6,259,367 B1, incorporated herein by reference in its entirety for all purposes. Another commercial source of suitable smart tags is Alien Technology Corporation of Morgan Hill, Calif., under the technology name FSA (Fluidic Self-Assembly). With the FSA process, tiny semiconductor devices are assembled into rolls of flexible plastic. The resulting "smart" substrate can be attached or embedded in a variety of surfaces. The smart tag technology under development at the Auto-ID Center at Massachusetts Institute of Technology (Cambridge, Mass.) can also be used within the scope of the present invention. Further information on smart tags and related technology is disclosed in U.S. Pat. No. 6,451,154, "RFID Manufacturing Concepts," issued Sep. 17, 2002 to Grabau et al.; U.S. Pat. No. 6,354,493, "System and Method for Finding a Specific RFID Tagged Article Located in a Plurality of RFID Tagged Articles," issued Mar. 12, 2002 to Mon; PCT publication WO 02/48955, published Jun. 20, 2002; U.S. Pat. No. 6,362,738, "Reader for Use in a Radio Frequency Identification System and Method," issued Mar. 26, 2002 to Vega; D. McFarlane, "Auto-ID Based Control," White Paper for the Auto-ID Centre Institute for Manufacturing, University of Cambridge, Cambridge, United Kingdom, Feb. 1, 2002, available at http://www.autoidcenter.org/research/CAM-AUTOID-WH004.pdf; and Chien Yaw Wong, "Integration of Auto-ID Tagging System with Holonic Manufacturing Systems," White Paper for the Auto-ID Centre Institute for Manufacturing, University of Cambridge, Cambridge, United Kingdom, September 2001, available at www.autoidcenter.org/research/CAM-WH-001.pdf.

Other RFID technologies include those produced by Microchip Technologies (Chandler, Ariz.), which provides remote read-write chips at several frequencies. Also of potential value are the I*CODE chips and readers of Philips Semiconductor (Eindhoven, The Netherlands), which, in one embodiment, are said to include 384 bit configurable read/write memory with 64 bits for a unique serial number (e.g., an electronic product code). Sokymat (Lausanne, Switzerland) markets the PICCOLO read-only RFID disc tag which transmits data to a reader station by an AM radio signal. The tag is said to have 64 bits of data that can be programmed during manufacture by laser fusing of polysilicon links in order to store a unique code on each tag.

Texas Instruments (Dallas, Tex.) offers RFID technology as part of Texas Instruments RFID (TI*RFID™) Systems, formerly known as the TIRIS.COPYRGT. system (Texas Instruments Registration and Identification System), which is used to track and identify various assets using devices such as the TI Tag It™ chip.

Gemplus (Gemenos, France) provides smart tags (sometimes called "smart labels") and smart cards employing RFID technology, which may be used as smart tags. They also market interfaces, scanners and software that can be adapted for use with smart tags.

Nedap (Groenlo, The Netherlands) provides smart cards and a 13.56 MHz smart tag using RFID technology with 512 bits of read-write memory with a range of about 120 cm. It is claimed that about 20 such tags per second can be read successfully by a scanner.

Checkpoint Systems Inc. (Miami, Fla.) offers a smart tag with WORM technology (write once, read many). One example is the MCRF355 chip, described more fully at http://www.idsystems.com/reader/1999.sub.—05/joi-n0599.htm.

PDA-like reader systems and other portable readers for RFID technology are marketed by Omron Company (Tokyo, Japan), such as the Model V700 or V720 series.

High frequency bands can be used in RFID technology, such as bands between 300 MHz and 10 GHz. SCS Corporation (Rancho Bernardo, Calif.), for example, markets smart tag technology at 2.45 GHz. Ultra-wide band technology can also be adapted for RFID systems. A related technology within the scope of the present invention is Surface Acoustic Wave (SAW) technology. For example, InfoRay (Cambridge, Mass.) markets a passive smart tag that is said to achieve long ranges (up to 30 meters) using a Surface Acoustic Wave (SAW) device. On a chip coupled with an antenna, the SAW device converts a radio signal to an acoustic wave, modulates it with an ID code, then transforms it to another radio signal that is emitted by the smart tag and read by a scanner. The ID code of the smart tag is extracted from the radio signal. The scanner is said to compare the spectral content of the signal with a database of signatures and to derive the ID code. This method enables a read range of up to 30 m (typical 10-20 m). The system can operate in the 915 MHz band and 2.45 GHz band. RFSAW, Inc. (Dallas, Tex.) also provides minute Surface Acoustic Wave (SAW) RFID devices that can be used within the scope of the present invention.

As shown in FIG. 1 and as described above, the present disclosure is particularly directed to incorporating an antenna 14 into the electronic signal emitting apparatus 10, which may be any suitable RFID tag or strap. The antenna comprises a nonwoven web made by combining conductive fibers with other fibers, such as pulp fibers and/or synthetic fibers. In one embodiment, for instance, a paper-making process may be used to form the webs.

The conductive fibers that may be used in accordance with the present disclosure can vary depending upon the particular application and the desired result. Conductive fibers that may be used to form the nonwoven webs include carbon fibers, metallic fibers, conductive polymeric fibers including fibers made from conductive polymers or polymeric fibers containing a conductive material, metal coated fibers, and mixtures thereof. Metallic fibers that may be used include, for instance, copper fibers, aluminum fibers, and the like. Polymeric fibers containing a conductive material include thermoplastic fibers coated with a conductive material or thermoplastic fibers impregnated or blended with a conductive material. For instance, in one embodiment, thermoplastic fibers may be used that are coated with silver.

The conductive fibers incorporated into the nonwoven material can have any suitable length and diameter. In one embodiment, for instance, the conductive fibers can have an aspect ratio of from about 100:1 to about 1,000:1.

The amount of conductive fibers contained in the nonwoven web can vary based on many different factors, such as the type of conductive fiber incorporated into the web and the ultimate end use of the web. The conductive fibers may be incorporated into the nonwoven web, for instance, in an amount from about 10% by weight to about 90% by weight, or even greater. For instance, the conductive fibers can be present in the nonwoven web in an amount from about 25% by weight to about 60% by weight, such as from about 25% by weight to about 40% by weight.

Carbon fibers that may be used in the present disclosure include fibers made entirely from carbon or fibers containing carbon in amounts sufficient so that the fibers are electrically conductive. In one embodiment, for instance, carbon fibers may be used that are formed from a polyacrylonitrile polymer. In particular, the carbon fibers are formed by heating, oxidizing, and carbonizing polyacrylonitrile polymer fibers. Such fibers typically have high purity and contain relatively high molecular weight molecules. For instance, the fibers can contain carbon in an amount greater than about 90% by weight, such as in an amount greater than 93% by weight, such as in an amount greater than about 95% by weight.

In order to form carbon fibers from polyacrylonitrile polymer fibers, the polyacrylonitrile fibers are first heated in an oxygen environment, such as air. While heating, cyano sites within the polyacrylonitrile polymer form repeat cyclic units of tetrahydropyridine. As heating continues, the polymer begins to oxidize. During oxidation, hydrogen is released causing carbon to form aromatic rings.

After oxidation, the fibers are then further heated in an oxygen starved environment. For instance, the fibers can be heated to a temperature of greater than about 1300° C., such as greater than 1400° C., such as from about 1300° C. to about 1800° C. During heating, the fibers undergo carbonization. During carbonization, adjacent polymer chains join together to form a lamellar, basal plane structure of nearly pure carbon.

Polyacrylonitrile-based carbon fibers are available from numerous commercial sources. For instance, such carbon fibers can be obtained from Toho Tenax America, Inc. of Rockwood, Tenn.

Other raw materials used to make carbon fibers are Rayon and petroleum pitch.

Of particular advantage, the formed carbon fibers can be chopped to any suitable length. In one embodiment of the present disclosure, for instance, chopped carbon fibers having a length of from about 1 mm to about 12 mm, such as from about 3 mm to about 6 mm, may be incorporated into the base web. The fibers can have an average diameter of from about 3 microns to about 15 microns, such as from about 5 microns to about 10 microns. In one embodiment, for instance, the carbon fibers may have a length of about 3 mm and an average diameter of about 7 microns.

In one embodiment, the carbon fibers incorporated into the nonwoven base webs have a water soluble sizing. Sizing can be in the amount of 0.1-10% by weight. Water soluble sizings, can be, but not limited to, polyamide compounds, epoxy resin ester and poly(vinyl pyrrolidone). The sizing is dissolved when mixing the carbon fibers in water to provide a good dispersion of carbon fibers in water prior to forming the nonwoven web.

In forming conductive-nonwoven webs in accordance with the present disclosure, the above conductive fibers are combined with other fibers. The fibers combined with the conductive fibers may comprise any natural or synthetic fibers including, but not limited to nonwoody fibers, such as cotton, abaca, kenaf, sabai grass, flax, esparto grass, straw, jute hemp, bagasse, milkweed floss fibers, and pineapple leaf fibers; and woody or pulp fibers such as those obtained from deciduous and coniferous trees, including softwood fibers, such as northern and southern softwood kraft fibers; hardwood fibers, such as eucalyptus, maple, birch, and aspen. Pulp fibers can be prepared in high-yield or low-yield forms and can be pulped by any known method, including kraft, sulfite, high-yield pulping methods and other known pulping methods. Fibers prepared from organosolv pulping methods can also be used, including the fibers and methods disclosed in U.S. Pat. No. 4,793,898, issued Dec. 27, 1988 to Laamanen et al.; U.S. Pat. No. 4,594,130, issued Jun. 10, 1986 to Chang et al.; and U.S. Pat. No. 3,585,104. Useful fibers can also be produced by anthraquinone pulping, exemplified by U.S. Pat. No. 5,595,628 issued Jan. 21, 1997, to Gordon et al.

All or a portion of the fibers can be synthetic fibers such as rayon, polyolefin fibers, polyester fibers, polyvinyl alcohol fibers, bicomponent sheath-core fibers, multi-component binder fibers, and the like. An exemplary polyethylene fiber is Pulpex®, available from Hercules, Inc. (Wilmington, Del.). Synthetic cellulose fiber types include rayon in all its varieties and other fibers derived from viscose or chemically-modified cellulose.

In one embodiment, synthetic fibers may be combined with pulp fibers. In this embodiment, the synthetic fibers may be present in an amount less than about 80% by weight, such as less than about 50% by weight, such as from about 5% to about 30% by weight. In an alternative embodiment, the conductive fibers may be combined with substantially only synthetic fibers in forming the nonwoven web. For example, absent the conductive fibers, the remaining fibers contained in the nonwoven web may comprise greater than about 90% by weight synthetic fibers such as 100% by weight synthetic fibers. Nonwoven webs made from primarily synthetic fibers may be more washable and wearable than a web made from primarily pulp fibers.

Incorporating thermoplastic fibers into the nonwoven web may provide various other advantages and benefits. For example, incorporating thermoplastic fibers into the web may allow the webs to be thermally bonded to adjacent structures. For instance, the webs may be thermally bonded to other nonwoven materials, such as a diaper liner which may comprise, for instance, a spunbond web.

Chemically and/or mechanically treated natural cellulosic fibers can also be used such as mercerized pulps, chemically stiffened or crosslinked fibers, or sulfonated fibers. For good mechanical properties in using papermaking fibers, it can be desirable that the fibers be relatively undamaged and largely unrefined or only lightly refined. Mercerized fibers, regenerated cellulosic fibers, cellulose produced by microbes, rayon, and other cellulosic material or cellulosic derivatives can be used. Suitable fibers can also include recycled fibers, virgin fibers, or mixtures thereof. In certain embodiments, the fibers can have a Canadian Standard Freeness of at least 200, more specifically at least 300, more specifically still at least 400, and most specifically at least 500.

Other papermaking fibers that can be used in the present disclosure include paper broke or recycled fibers and high yield fibers. High yield pulp fibers are those papermaking fibers produced by pulping processes providing a yield of about 65% or greater, more specifically about 75% or greater, and still more specifically about 75% to about 95%. Yield is the resulting amount of processed fibers expressed as a percentage of the initial wood mass. Such pulping processes include bleached chemithermomechanical pulp (BCTMP), chemithermomechanical pulp (CTMP), pressure/pressure thermomechanical pulp (PTMP), thermomechanical pulp (TMP), thermomechanical chemical pulp (TMCP), high yield sulfite pulps, and high yield Kraft pulps, all of which leave the resulting fibers with high levels of lignin. High yield fibers are well known for their stiffness in both dry and wet states relative to typical chemically pulped fibers.

In general, any process capable of forming a paper web can be utilized in forming the conductive web. For example, a paper-making process of the present disclosure can utilize embossing, wet pressing, air pressing, through-air drying, uncreped through-air drying, hydroentangling, air laying, as well as other steps known in the art. The paper web may be formed from a fiber furnish containing pulp fibers in an amount of at least 50% by weight, such as at least 60% by weight, such as at least 70% by weight.

The nonwoven webs can also be pattern densified or imprinted, such as the paper sheets disclosed in any of the following U.S. Pat. No. 4,514,345 issued on Apr. 30, 1985, to Johnson et al.; U.S. Pat. No. 4,528,239 issued on Jul. 9, 1985, to Trokhan; U.S. Pat. No. 5,098,522 issued on Mar. 24, 1992; U.S. Pat. No. 5,260,171 issued on Nov. 9, 1993, to Smurkoski et al.; U.S. Pat. No. 5,275,700 issued on Jan. 4, 1994, to Trokhan; U.S. Pat. No. 5,328,565 issued on Jul. 12, 1994, to Rasch et al.; U.S. Pat. No. 5,334,289 issued on Aug. 2, 1994, to Trokhan et al.; U.S. Pat. No. 5,431,786 issued on Jul. 11, 1995, to Rasch et al.; U.S. Pat. No. 5,496,624 issued on Mar. 5, 1996, to Steltjes, Jr. et al.; U.S. Pat. No. 5,500,277 issued on Mar. 19, 1996, to Trokhan et al.; U.S. Pat. No. 5,514,523 issued on May 7, 1996, to Trokhan et al.; U.S. Pat. No. 5,554,467 issued on Sep. 10, 1996, to Trokhan et al.; U.S. Pat. No. 5,566,724 issued on Oct. 22, 1996, to Trokhan et al.; U.S. Pat. No. 5,624,790 issued on Apr. 29, 1997, to Trokhan et al.; and, U.S. Pat. No. 5,628,876 issued on May 13, 1997, to Ayers et al., the disclosures of which are incorporated herein by reference to the extent that they are non-contradictory herewith. Such imprinted paper sheets may have a network of densified regions that have been imprinted against a drum dryer by an imprinting fabric, and regions that are relatively less densified (e.g., "domes" in the paper sheet) corresponding to deflection conduits in the imprinting fabric, wherein the paper sheet superposed over the deflection conduits was deflected by an air pressure differential across the deflection conduit to form a lower-density pillow-like region or dome in the paper sheet.

The paper web can also be formed without a substantial amount of inner fiber-to-fiber bond strength. In this regard, the fiber furnish used to form the base web can be treated with a chemical debonding agent. The debonding agent can be added to the fiber slurry during the pulping process or can be added directly to the headbox. Suitable debonding agents that may be used in the present disclosure include cationic debonding agents such as fatty dialkyl quaternary amine salts, mono fatty alkyl tertiary amine salts, primary amine salts, imidazoline quaternary salts, silicone quaternary salt and unsaturated fatty alkyl amine salts. Other suitable debonding agents are disclosed in U.S. Pat. No. 5,529,665 to Kaun which is incorporated herein by reference. In particular, Kaun discloses the use of cationic silicone compositions as debonding agents.

Wet and dry strength agents may also be applied or incorporated into the base sheet. As used herein, "wet strength agents" refer to materials used to immobilize the bonds between fibers in the wet state. Typically, the means by which fibers are held together in paper and paper products involve hydrogen bonds and sometimes combinations of hydrogen bonds and covalent and/or ionic bonds. In the present invention, it may be useful to provide a material that will allow bonding of fibers in such a way as to immobilize the fiber-to-fiber bond points and make them resistant to disruption in the wet state.

Any material that when added to a paper sheet or sheet results in providing the paper sheet with a mean wet geometric tensile strength:dry geometric tensile strength ratio in excess of about 0.1 will, for purposes of the present invention, be termed a wet strength agent. Typically these materials are termed either as permanent wet strength agents or as "temporary" wet strength agents. For the purposes of differentiating permanent wet strength agents from temporary wet strength agents, the permanent wet strength agents will be defined as those resins which, when incorporated into paper or paper products, will provide a paper or paper product that retains more than 50% of its original wet strength after exposure to water for a period of at least five minutes. Temporary wet strength agents are those which show about 50% or less than, of their original wet strength after being saturated with water for five minutes. Both classes of wet strength agents find application in the present invention. The amount of wet strength agent added to the pulp fibers may be at least about 0.1 weight percent, more specifically about 0.2 weight percent or greater, and still more specifically from about 0.1 to about 3 weight percent, based on the dry weight of the fibers.

Permanent wet strength agents will typically provide a more or less long-term wet resilience to the structure of a paper sheet. In contrast, the temporary wet strength agents will typically provide paper sheet structures that have low density and high resilience, but do not provide a structure that has long-term resistance to exposure to water or body fluids. Thus, in some embodiments, permanent wet strength agents may be preferred.

The temporary wet strength agents may be cationic, non-ionic or anionic. Such compounds include PAREZ™ 631 NC and PAREZ® 725 temporary wet strength resins that are cationic glyoxylated polyacrylamide available from Cytec Industries (West Paterson, N.J.). This and similar resins are described in U.S. Pat. No. 3,556,932, issued on Jan. 19, 1971, to Coscia et al. and U.S. Pat. No. 3,556,933, issued on Jan. 19, 1971, to Williams et al. Hercobond 1366, manufactured by Hercules, Inc., located at Wilmington, Del., is another commercially available cationic glyoxylated polyacrylamide that may be used in accordance with the present invention. Additional examples of temporary wet strength agents include dialdehyde starches such as Cobond® 1000 from National Starch and Chemical Company and other aldehyde containing polymers such as those described in U.S. Pat. No. 6,224,714, issued on May 1, 2001, to Schroeder et al.; U.S. Pat. No. 6,274,667, issued on Aug. 14, 2001, to Shannon et al.; U.S. Pat. No. 6,287,418, issued on Sep. 11, 2001, to Schroeder et al.; and, U.S. Pat. No. 6,365,667, issued on Apr. 2, 2002, to Shannon et al., the disclosures of which are herein incorporated by reference to the extent they are non-contradictory herewith.

Permanent wet strength agents comprising cationic oligomeric or polymeric resins can be used in the present invention. Polyamide-polyamine-epichlorohydrin type resins such as KYMENE 557H sold by Hercules, Inc., located at Wilmington, Del., are the most widely used permanent wet-strength agents and are suitable for use in the present invention. Such materials have been described in the following U.S. Pat. No. 3,700,623, issued on Oct. 24, 1972, to Keim; U.S. Pat. No. 3,772,076, issued on Nov. 13, 1973, to Keim; U.S. Pat. No. 3,855,158, issued on Dec. 17, 1974, to Petrovich et al.; U.S. Pat. No. 3,899,388, issued on Aug. 12, 1975, to Petrovich et al.; U.S. Pat. No. 4,129,528, issued on Dec. 12, 1978, to Petrovich et al.; U.S. Pat. No. 4,147,586, issued on Apr. 3, 1979, to Petrovich et al.; and, U.S. Pat. No. 4,222,921, issued on Sep. 16, 1980, to van Eenam. Other cationic resins include polyethylenimine resins and aminoplast resins obtained by reaction of formaldehyde with melamine or urea. It can be advantageous to use both permanent and temporary wet strength resins in the manufacture of paper products.

Dry strength agents are well known in the art and include but are not limited to modified starches and other polysaccharides such as cationic, amphoteric, and anionic starches and guar and locust bean gums, modified polyacrylamides, carboxymethylcellulose, sugars, polyvinyl alcohol, chitosans, and the like. Such dry strength agents are typically added to a fiber slurry prior to paper sheet formation or as part of the creping package.

Nonwoven webs made according to the present disclosure may also be treated with various binders. The binders, for instance, may be applied to one or more surfaces of the web. Binders that may be used include emulsions and various starch-based materials. One embodiment of a latex binder that may be used includes CP620NA binder available from Dow Chemical. An example of a starch binder that may be applied to the nonwoven web is PG 290 available from Penford Products.

Nonwoven webs made in accordance with the present disclosure can include a single homogeneous layer of fibers or may include a stratified or layered construction. For instance, the nonwoven web may include two or three layers of fibers contained in a single ply. Each layer may have a different fiber composition. For example, in one embodiment, the nonwoven web may include two layers of fibers. The first layer may contain all pulp fibers, while the second layer may contain pulp fibers combined with conductive fibers.

Figure 2:
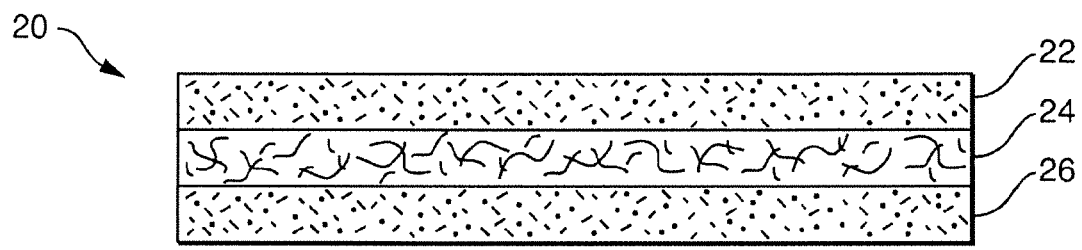
FIG. 2 is a cross-sectional view of one embodiment of a radiating element made in accordance with the present disclosure.

In another embodiment, the nonwoven web may contain three layers of fibers as illustrated in FIG. 2. As shown, the nonwoven web 20 may include a middle layer of fibers positioned in between a first outer layer 22 and a second outer layer 26. The particular fibers contained in each layer may depend upon the product being formed and the desired results. In one embodiment, for instance, the middle layer 24 may contain pulp fibers in combination with the conductive fibers. The outer layers 22 and 26, on the other hand, can contain only pulp fibers, such as softwood fibers and/or hardwood fibers.

Placing the conductive fibers within the middle layer 24 may provide various advantages and benefits. Concentrating the fibers in one of the layers of the web can improve the conductivity of the material without having to add great amounts of the conductive fibers. In one embodiment, for instance, a three-layered web is formed in which each layer accounts for from about 15% to about 40% by weight of the web. The outer layers can be made of only pulp fibers or a combination of pulp fibers and thermoplastic fibers. The middle layer, on the other hand, may contain pulp fibers combined with conductive fibers. The conductive fibers may be contained in the middle layer in an amount from about 10% to about 90% by weight, such as in an amount from about 30% to about 70% by weight, such as in an amount from about 40% to about 60% by weight.

As described above, in one embodiment, the nonwoven web can be made using a wet-laid process. For instance, an aqueous suspension of fibers can be spread onto a forming surface in order to form the nonwoven web. The web may be formed and processed using various techniques and methods. For example, in one embodiment, the nonwoven web may be formed using an uncreped, through-air drying process. Processes for producing uncreped throughdried fabrics are, for instance, disclosed in U.S. Pat. No. 5,672,248 to Wendt, et al.; U.S. Pat. No. 5,656,132 to Farrington, et al.; U.S. Pat. No. 6,120,642 to Lindsay and Burazin; U.S. Pat. No. 6,096,169 to Hermans, et al.; U.S. Pat. No. 6,197,154 to Chen, et al.; and U.S. Pat. No. 6,143,135 to Hada, et al., all of which are herein incorporated by reference in their entireties.

In one embodiment, the nonwoven web can be densified so as to lower the bulk. The nonwoven web can be densified using various techniques. For example, in one embodiment, the nonwoven web can be fed through the nip of a pair of opposing calender rolls. Alternatively, the nonwoven web can be made according to a wetlaid paper-making process and then wet pressed during the drying phase. In this manner, nonwoven webs can be made having a bulk of less than about 1 cc/g, such as less than 0.5 cc/g, such as less than about 0.05 cc/g. When densifying the web as described above, in one embodiment, the conductive fibers can be homogenously distributed with the pulp fibers.

Nonwoven webs made in accordance with the present disclosure can have various different properties and characteristics depending upon the application in which the webs are to be used and the desired results. For instance, the nonwoven web can have a basis weight of from about 15 gsm to about 200 gsm or greater. For instance, the basis weight of the nonwoven web can be from about 15 gsm to about 100 gsm, such as from about 15 gsm to about 50 gsm.

If desired, the nonwoven web can be made with a relatively high bulk. For instance, the bulk can be from about 2 cc/g to about 10 cc/g. In other embodiments, however, it may be desirable to form a more compacted web through calendering or any suitable flattening process. For example, in other embodiments, the bulk can be less than about 5 cc/g, such as less than about 2 cc/g, such as less than about 1 cc/g.

The sheet "bulk" is calculated as the quotient of the caliper of a dry paper sheet, expressed in microns, divided by the dry basis weight, expressed in grams per square meter. The resulting sheet bulk is expressed in cubic centimeters per gram. More specifically, the caliper is measured as the total thickness of a stack of ten representative sheets and dividing the total thickness of the stack by ten, where each sheet within the stack is placed with the same side up. Caliper is measured in accordance with TAPPI test method T411 om-89 "Thickness (caliper) of Paper, Paperboard, and Combined Board" with Note 3 for stacked sheets. The micrometer used for carrying out T411 om-89 is an Emveco 200-A Tissue Caliper Tester available from Emveco, Inc., Newberg, Oreg. The micrometer has a load of 2.00 kilo-Pascals (132 grams per square inch), a pressure foot area of 2500 square millimeters, a pressure foot diameter of 56.42 millimeters, a dwell time of 3 seconds and a lowering rate of 0.8 millimeters per second.

When the nonwoven, conductive web is used to receive or transmit signals, the web should have sufficient conductivity for its intended purpose. The conductivity of the nonwoven web can vary depending upon the type of conductive fibers incorporated into the web, the amount of conductive fibers incorporated into the web, and the manner in which the conductive fibers are positioned, concentrated or oriented in the web. In one embodiment, for instance, the conductivity of the nonwoven web should be at least about 1000 S/m, such as at least $10^4$ S/M, such as at least about $10^5$ S/M.

The nonwoven web can also have a surface resistance of less than about 1500 Ohms/square, such as less than about 100 Ohms/square, such as less than about 10 Ohms/square.

The surface resistance of the sheet is determined in accordance with ASTM F1896-98 "Test Method for Determining the Electrical Resistivity of a Printed Conductive Material". The resistance measuring device (or Ohm meter) used for carrying out ASTM F1896-98 is a Fluke multimeter (model 189) equipped with Fluke alligator clips (model AC120); both are available from Fluke Corporation, Everett, Wash.

Once the nonwoven web is formed, the web can be cut to any suitable shape for use as a radiating element. The shape and size of the nonwoven web when used as an antenna can be selected depending upon various factors, including the frequency at which the electronic apparatus operates. As shown in FIG. 1, in one embodiment, the nonwoven web can be in the form of strips when used to construct the radiating element. The strips, for instance, may have a length to width ratio of from about 10 to about 50. For example, in one embodiment, when designed to transmit ultra-high frequency signals, the strips can have a length of from about 125 mm to about 200 mm, such as from about 140 mm to about 160 mm and a width of from about 3 mm to about 30 mm, such as from about 5 mm to about 10 mm.

It should be understood, however, that in other embodiments other shapes may be desired. For instance, it is believed that the nonwoven web can be configured to operate within many frequency ranges. Thus, the shape can vary dramatically depending upon the particular frequency that is to be used.

When forming the nonwoven web into an antenna, the nonwoven web can be cut using any suitable technique or method. Care should be taken, however, in cutting the web so as to not adversely interfere with the conductive fibers and thus the conductivity of the web. In one embodiment, for instance, the web can be cut using ultrasonic energy. Using a cutting tool that operates on ultrasonic energy, for instance, imparts enough energy into the web to break the conductive fibers without adversely affecting the overall conductivity of the web.

Once formed and sized to the appropriate shape, the antenna portions 16 and 18 as shown in FIG. 1 can be connected to the signal generating device 12 using any suitable method or technique. In one embodiment, for instance, the antenna portions 16 and 18 can be electrically connected to the signal generating device 12 using a conductive adhesive.

In order to operate the electronic signal emitting apparatus 10 as shown in FIG. 1 and/or to receive a signal from the apparatus, the apparatus can be used in conjunction with a suitable reader. A reader, for instance, may be integrated into or added on to a computer, a personal data assistant device, a laptop computer, a cellular telephone, or other electronic device. Readers for use with the apparatus may include any known variety, including multi-protocol readers that scan multiple frequencies or that are adapted for reading a variety of RFID tags or other identification elements. Data mechanism readers may also be adaptive readers that adjust their scanning frequency, signal strength, and/or signal orientation or direction to improve the signal obtained from the tag or tags being read. As described above, the apparatus and the reader can work at different frequencies including high-frequency, very-high frequency, and ultra-high frequency.

The electronic signal emitting apparatus 10 made in accordance with the present disclosure may be used in numerous and different applications. For example, the apparatus may be used in supply chain management, in order to improve the efficiency of inventory tracking and management. The electronic apparatus may also be used to replace bar codes. In this manner, the signal emitting apparatus of the present disclosure can be used in conjunction with virtually all consumer products.

In other applications, the electronic signal emitting apparatus may be used in various other products, such as in passports and for public transit passes. The signal emitting apparatus, for instance, may indicate that a person or vehicle has paid a toll or is to be charged a toll when traveling over a toll road or on a public transportation system such as a bus or train. The electronic signal emitting apparatus can also be used for product tracking and for tracking books in a library. The signal emitting apparatus can also be used at schools and in hospitals to track students and patients respectively.

In one particular application, the electronic signal emitting apparatus may comprise a biosensor. A biosensor generally refers to a sensor that senses biological readings for a physiological parameter associated with an organism, such as the body of a mammal. In this embodiment, the biosensor may be configured to sense biological readings and to transmit them to an appropriate reader using the signal emitting device. In some cases, unprocessed bio-sensor data is representative of a physiological parameter. In other cases, biosensor data is used by a computing device to calculate data representative of a physiological parameter. The monitored body may be that of any mammal, including humans.

Exemplary body parameters that may be sensed using the biosensor include any combination of: 1) body temperature; 2) blood pressure; 3) heart rate; 4) blood sugar levels; 5) blood oxygen levels; 6) cholesterol level; 7) respiration rate; 8) hormone level; 9) galvanic skin response; 10) EMG; 11) EEG; 12) EKG; 13) body fat; 14) hydration level; 15) activity level; 16) body position; 17) UV radiation exposure; 18) UV radiation absorption, and the like. The electronic apparatus of the present disclosure may be configured to sense or process any of the above bio-sensor data locally and to transfer/transmit processed or unprocessed sensor data to any suitable reader using the antenna of the present disclosure.

Figure 3:
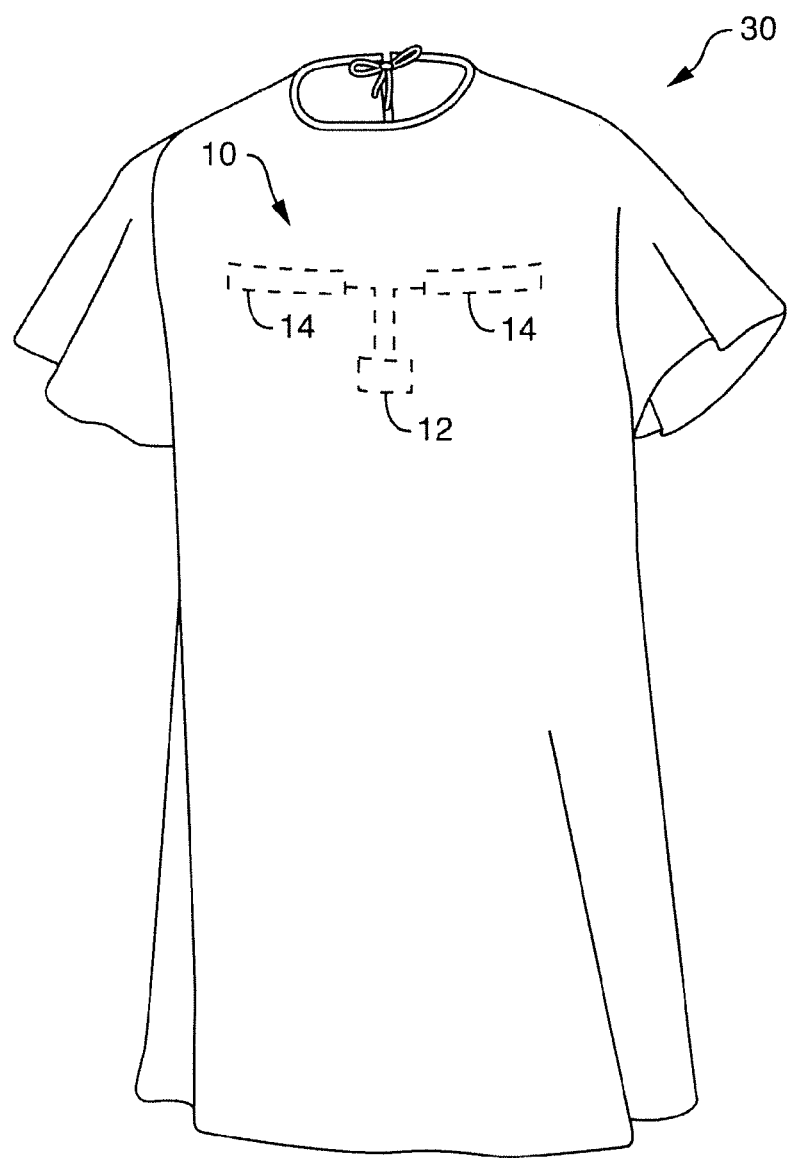
FIG. 3 is a plan view of one embodiment of a garment made in accordance with the present disclosure.

Of particular advantage, the antenna of the present disclosure can be incorporated into any suitable garment for transmitting various biosensor information. For example, referring to FIG. 3, a hospital gown generally 30 is shown. In accordance with the present disclosure, the electronic signal emitting apparatus 10 has been incorporated into the gown. As shown, the apparatus 10 includes a signal generating device 12 in communication with an antenna 14. In this embodiment, the signal generating device 12 may comprise any suitable biosensor for sensing a physiological trait of the patient wearing the gown 30. Using a conductive-nonwoven web as the antenna 14 allows for the antenna to be easily incorporated into the garment since the antenna not only has the benefit of being flexible but also allows comfortable fit to any body. In addition, the antenna is relatively inexpensive to manufacture.

In addition to being incorporated into garments and other products, the antennae of the present disclosure can also be easily incorporated into various packaging materials. For instance, the antennae can be incorporated into films and other plastics. In one embodiment, the antennae can be incorporated into paperboard, such as corrugated paper. Of particular advantage, the antennae can be incorporated into any suitable paperboard material during formation of the paperboard using the techniques described above. When incorporated into the packaging, for instance, the antennae and associated signal generating device may be used for supply chain applications.

The present disclosure may be better understood with reference to the following example.

EXAMPLE 1

A conductive-nonwoven web was made in accordance with the present disclosure and tested as an antenna. In particular, a half-wave dipole antenna was constructed from a conductive-nonwoven material made in accordance with the present disclosure and tested for its ability to transmit signals.

In this example, two identical strips of a conductive paper material made in accordance with the present disclosure were attached to a pre-existing antenna base and connected to a signal generator. The strips of the conductive paper material contained carbon fiber and formed a half-wave dipole antenna. The antenna was designed to radiate at 915 MHz. The effective length of the antenna was 164 mm. A simple test was conducted to measure the radiated power of the antenna. The signal generator transmitted a 10 dBm signal at 900 MHz from the antenna. A calibrated antenna at 900 MHz connected to a spectrum analyzer was used to measure the received signal when placed 1 meter away from the antenna.

The conductive-nonwoven web that was used to form the antenna comprised an uncreped through-air dried web containing carbon fibers. The carbon fibers were present in the web in an amount of 25% by weight. In this embodiment, the single ply web contained three discrete layers with the conductive fibers present in the middle layer of the web.

Power received at the calibrated antenna was measured to be −29.5 dBm.

The above results demonstrate that the conductive, nonwoven web may be effectively used as an antenna in conjunction with a signal generating device. For example, the above experiment was repeated by replacing the above described antennae with another antennae made of a rigid copper wire as the radiating element. The power received at the calibrated antennae was measured to be −26.8 dBm, which is very comparable to the result obtained above when using the antennae made according to the present disclosure.

The above results demonstrate that the conductive, nonwoven web made in accordance with the present disclosure may be effectively used as an antennae in conjunction with a signal generating device.

EXAMPLE 2

A half-wave dipole antenna as constructed in Example 1 was attached to a pre-existing RFID strap. The RFID strap operated in the ultra-high frequency range. The sensitivity of the antenna made from the conductive web was measured by monitoring the minimum power required for the RFID strap to respond to an RFID reader antenna placed precisely 1 meter away. The sensitivity of the antenna was estimated to be −5.1 dBm, which is sufficient for reading effectively.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An electronic signal emitting apparatus comprising:
   a signal generating device; and
   a radiating element for receiving and transmitting signals from the signal generating device, the radiating element comprising a nonwoven web containing pulp fibers, synthetic fibers or mixtures thereof, the nonwoven web further containing conductive fibers, the conductive fibers being present in an amount of at least about 10% by weight.

2. An apparatus as defined in claim 1, wherein the nonwoven web has a conductivity of at least about 1000 S/m.

3. An apparatus as defined in claim 1, wherein the apparatus transmits signals in a frequency range of from about 300 MHz to about 3000 MHz.

4. An apparatus as defined in claim 1, wherein the radiating element comprises two strips of the nonwoven web, the radiating element comprising a half-wave dipole antenna.

5. An apparatus as defined in claim 1, wherein the conductive fibers comprise carbon fibers.

6. An apparatus as defined in claim 1, wherein the conductive fibers comprise metallic fibers, conductive polymeric fibers, or metal coated fibers.

7. An apparatus as defined in claim 4, wherein the strips of the nonwoven web have a length to width ratio of from about 10 to about 50.

8. An apparatus as defined in claim 1, wherein the nonwoven web comprises a wet-laid web.

9. An apparatus as defined in claim 1, wherein the nonwoven web comprises a single ply web containing distinct layers of fibers, the nonwoven web including at least a first layer and a second layer, the conductive fibers all being contained in the second layer.

10. An apparatus as defined in claim 9, wherein the nonwoven web further includes a third layer of fibers, the second layer being positioned in between the first layer and the third layer.

11. An apparatus as defined in claim 1, wherein the nonwoven web contains pulp fibers in an amount of at least about 30% by weight.

12. An apparatus as defined in claim 1, wherein the nonwoven web has a basis weight of from about 15 gsm to about 100 gsm.

13. An apparatus as defined in claim 1, wherein the conductive fibers are contained in the nonwoven web in an amount of at least about 25% by weight.

14. An apparatus as defined in claim 9, wherein the conductive fibers comprise carbon fibers.

15. An apparatus as defined in claim 5, wherein the conductive fibers have an average length of from about 1 mm to about 12 mm and have an aspect ratio of from about 100:1 to about 1000:1.

16. An apparatus as defined in claim 1, wherein the apparatus comprises a radio frequency identification device.

17. A garment configured to cover a portion of a person's body, the garment incorporating the electronic signal emitting apparatus as defined in claim 1, the apparatus being configured to transmit data about the wearer.

18. An apparatus as defined in claim 16, wherein the radio frequency identification device comprises a passive device.

19. An apparatus as defined in claim 18, wherein the signal generating device stores and processes data.

20. An apparatus as defined in claim 1, wherein the nonwoven web includes a first surface and a second surface and wherein at least one surface of the nonwoven web is treated with a binder.

21. An apparatus as defined in claim 1, wherein the nonwoven web in addition to the conductive fibers contains substantially only pulp fibers.

22. An apparatus as defined in claim 1, wherein the nonwoven web in addition to the conductive fibers contains substantially only synthetic fibers.

23. An apparatus as defined in claim 1, wherein the nonwoven web contains a single layer of fibers having a homogenous distribution.

24. An apparatus as defined in claim 1, wherein the radiating element is connected to the signal generating device by a conductive adhesive.

25. An apparatus as defined in claim 18, wherein the radiating element is connected to the signal generating device by a conductive adhesive.

26. A package for a product, the package being made from a paperboard material, the package being attached to the electronic signal emitting apparatus as defined in claim 1, the radiating element being incorporated into the paperboard material.

27. A package as defined in claim 26, wherein the paperboard material comprises a corrugate.

28. A package as defined in claim 26, wherein the radiating element is incorporated into the paperboard material during formation of the paperboard material thus making the radiating element integral with the paperboard material.

29. A package as defined in claim 26, wherein the signal emitting apparatus comprises a radio frequency identification device, the signal generating device being attached to the paperboard material and being in electrical communication with the radiating element incorporated into the paperboard material.

\* \* \* \* \*